Oct. 22, 1968

J. M. ZAPPIA 3,406,580

SCANNER DRIVE DEVICE

Filed Jan. 23, 1967

INVENTOR.
JOSEPH M. ZAPPIA
BY
Hood, Gust & Irish
ATTORNEYS

Oct. 22, 1968        J. M. ZAPPIA        3,406,580

SCANNER DRIVE DEVICE

Filed Jan. 23, 1967        2 Sheets-Sheet 2

INVENTOR.
JOSEPH M. ZAPPIA
BY
Hood, Gust & Irish
ATTORNEYS

United States Patent Office

3,406,580
Patented Oct. 22, 1968

3,406,580
SCANNER DRIVE DEVICE
Joseph M. Zappia, Hialeah, Fla., assignor to Datatype Corporation, Hialeah, Fla., a corporation of Florida
Filed Jan. 23, 1967, Ser. No. 611,114
12 Claims. (Cl. 74—37)

ABSTRACT OF THE DISCLOSURE

A device for moving an element in one direction along a predetermined path and automatically releasing said element at the end of its travel comprising a pusher arm carried by an endless, flexible means which is trained about a pair of support means. The pusher arm engages the element and moves it until the pusher arm is moved about one of the support means, whereby the pusher arm is pivoted to release the element.

---

The present invention relates generally to a scanner drive device, and more particularly to the means and methods for providing a device for moving an element in one direction along a predetermined path and automatically releasing said element at the end of its travel. The drive device of the present invention is ideally suited for driving a scanner head of the type normally used for scanning a computer card or the like a predetermined distance along a predetermined path.

It is an object of the present invention, therefore, to provide a driving device for moving an element, such as a scanner head, in one direction along a predetermined path and automatically releasing said element at the end of its travel.

Another object of the present invention is to provide such a driving device including a pusher arm carried by an endless, flexible means trained about a pair of support means, at least one of said support means being rotatable and drivingly connected to said flexible means, said pusher arm being arranged to pivot with respect to said flexible means to release the element driven thereby when said pusher arm is moved about one of said support means.

A further object of the present invention is to provide such a driving device including means for adjustably positioning one of the aforementioned support means selectively to determine a point at which the aforementioned pusher arm will release the element driven thereby.

Still another object of the present invention is to provide a scanner head arranged for movement along a predetermined path, energy storage means arranged to urge said scanner head in one direction along said path, and a driving device of the type described above arranged for moving said scanner head a predetermined distance along said path and in opposition to said energy storage means.

Other objects and features of the present invention will become apparent as this description progresses.

To the accomplishment of the above and related objects, the present invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 6:
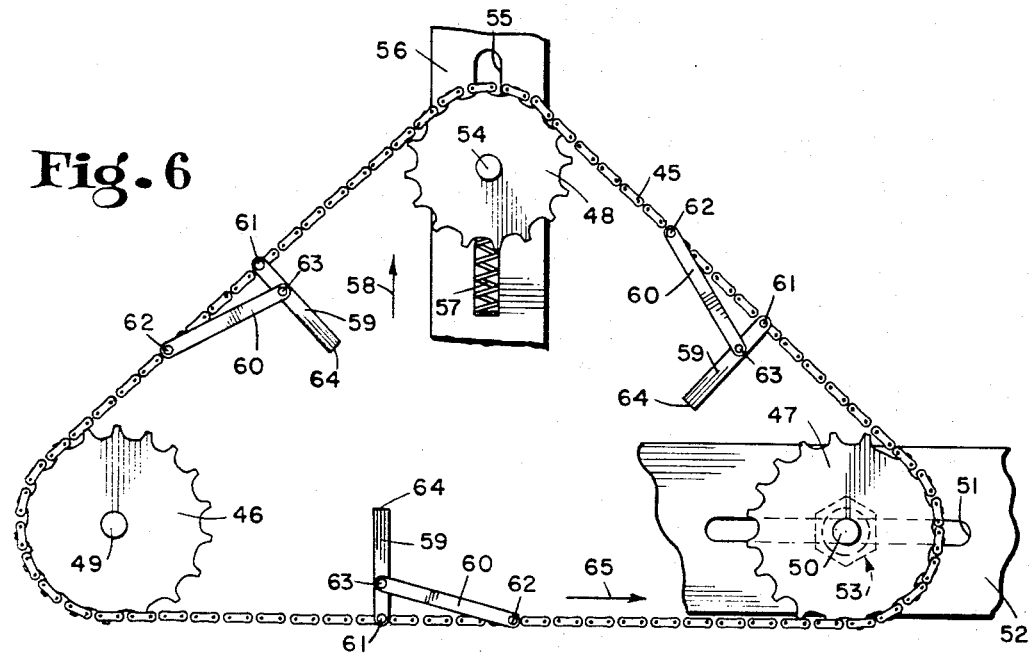
Figure 7:
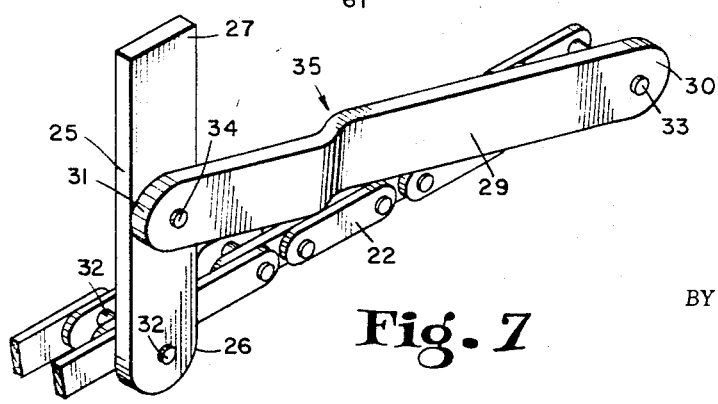

FIG. 6 is an elevational view of another embodiment of the present invention illustrating means for adjustably determining the travel of an element driven by the aforementioned pusher arm; and FIG. 7 is a perspective view of a pusher arm with an associated link pivotally connected thereto and illustrating an offset in the link which permits pivoting of the pusher arm when the link and pusher arm are moved about a sprocket.

Referring now to the drawings, the structure of the present invention can be visualized in conjunction with the following description.

Figure 1:
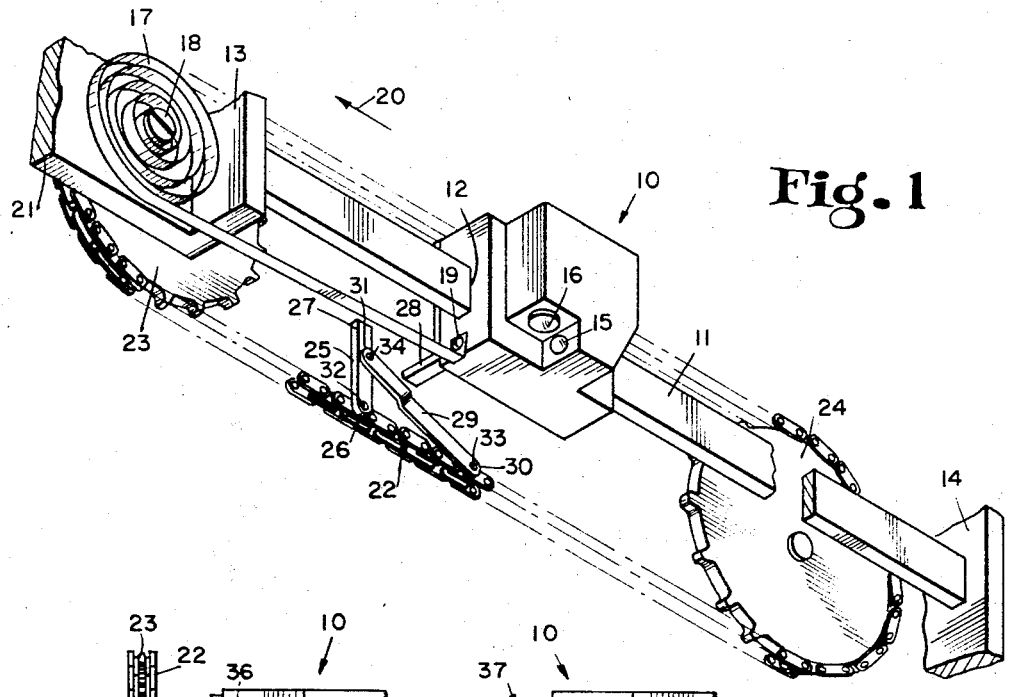
FIG. 1 is a perspective view illustrating one embodiment of the scanner drive device of the present invention.

In the illustrative embodiment of FIG. 1, a scanner head, indicated generally by the reference number 10, is reciprocably mounted on a guide bar 11 which extends through a hole 12 in the scanner head 10. The guide bar 11 is supported at its ends by supports 13 and 14. The scanner head 10 is of the type normally used to scan computer cards or the like having coded information arranged thereon. In the illustrative embodiment of FIG. 1, the scanner head 10 is shown with a light source 15 and a lens 16 to indicate that the scanner head operates on a photo-electric principle. Scanner heads of this type are well known in the data processing art and need not be discussed in this description.

A spring 17 having one end spiralled around and connected to a post 18 and its other end connected to the scanner head 10 at the point 19 is arranged to urge the scanner head in the direction of the arrow 20. In the illustrative embodiment of FIG. 1, the post 18 is connected to an extension 21 of the support 13. It can be seen that the spring 17 is an energy storage means for constantly urging the scanner head 10 in the direction of the arrow 20 toward its original starting position.

There is an endless flexible element, hereinafter referred to as the chain 22, trained about a pair of support means, hereinafter referred to as the sprockets 23 and 24. The sprockets 23 and 24 are rotatably mounted, and at least one of said sprockets is driven to move the chain 22 thereabout. There is a pusher arm 25 having one end 26 pivotally connected to the chain 22 and its other end 27 proportioned and arranged to engage and move the scanner head 10. In the illustrative embodiment, the scanner head 10 is provided with an outwardly extending member 28 which is engaged and driven by the end 27 of the pusher arm 25. There is a link 29 having one end 30 pivotally connected to the chain 22 at a predetermined distance from the point at which the pusher arm 25 is pivotally connected to the chain 22 and its other end 31 pivotally connected to the pusher arm 25 at a second predetermined distance from the point at which the pusher arm 25 is pivotally connected to the chain 22.

A specific structure for the pusher arm 25 and link 29 is shown clearly in FIG. 7. In FIG. 7 it can be seen that the pusher arm 25 is pivotally connected to the chain 22 by means of the pivot pin 32, the link 29 is pivotally connected to the chain 22 by a pivot pin 33 and the link 29 is pivotally connected to the pusher arm 25 by a pivot pin 34. The pivot pins 32 and 33 are preferably extended pins which pivotally connect links of the chain 22. The link 29 is provided with an offset, indicated generally by the reference number 35, which permits the link to clear the pivot pin 32 when the pusher arm 25 pivots with respect to the chain 22 and the link 29.

Figures 2, 3:
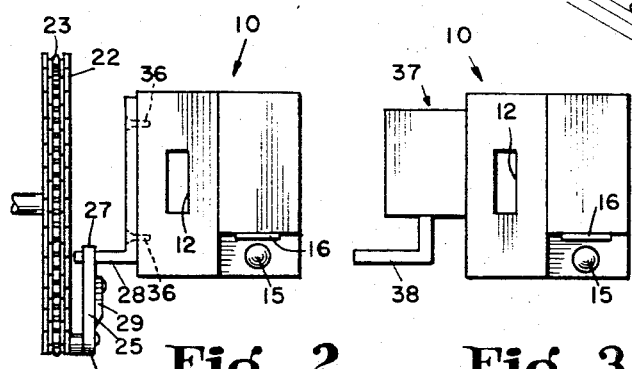
FIG. 2 is an end view of the device shown in FIG. 1 illustrating how the pusher arm of the scanner drive device engages the member having a portion extending into the path of said pusher arm.
FIG. 3 is an end view of a scanner head illustrating a solenoid-operated arm for engaging the aforementioned pusher arm.

An end view of the embodiment shown in FIG. 1 is illustrated in FIG. 2 to show the relationship between the scanner head 10, guide bar 11, and chain 22. It can be seen that the member 28 which extends into the path of the pusher arm 25 is fastened to the scanner head 10 by means of screws 36. Thus, the scanner head 10 will be moved by movement of the pusher arm 25 until the pusher arm is pivoted to release the member 28.

In the embodiment shown in FIG. 3, the scanner head 10 is provided with a solenoid, indicated generally by the reference number 37, which operates a member 38, similar to the member 28, which is engaged and driven by the pusher arm 25. The solenoid 37 and member 38 comprise an electrically operated means for selectively disengaging the scanner head 10 from the pusher arm 25, thereby permitting the scanner head 10 to be returned by the spring 17. The solenoid 37 can be energized to move the member 38 out of the path of the pusher arm 25 at any point during the travel of the scanner head 10. The electrical signal for operating the solenoid 37 can be obtained in any number of obvious ways. For instance, the scanner head 10 can be provided with circuitry for operating the solenoid 37 when predetermined readings are obtained by the lens 16.

Once the member 28 is engaged with and driven by the pusher arm 25, the scanner head will continue to move in a direction opposite to the arrow 20 until the link 29 and pusher arm 25 are moved about the sprocket 24. That is, the distances between the pivot pins 32 and 33 and between the pivot pins 32 and 34 are such that the pusher arm 25 is swung rearwardly with respect to the chain 22 to release the member 28 as the pivot pin 33 begins to move about the sprocket 24.

Figure 4:
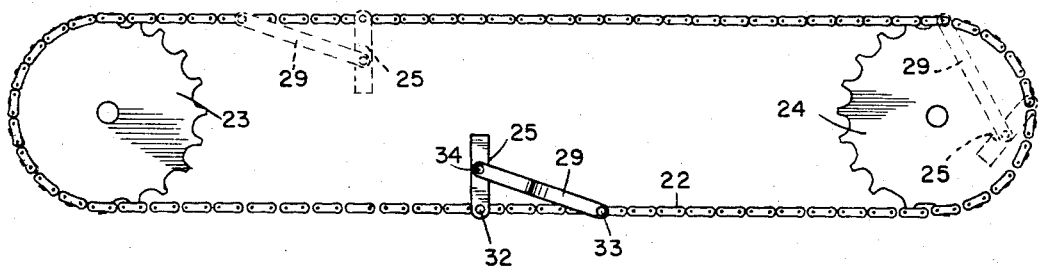
FIG. 4 is an elevational view illustrating the drive device of the present invention in its simplest form.

FIG. 4 is nn illustration of the various positions of the pusher arm 25 and the link 29 as they are moved by the chain 22 about the sprockets 23 and 24. The pivoting action of the pusher arm 25 as it is moved about the sprocket 24 is suggested in FIG. 4 by the dashed outline drawing of the pusher arm 25 and link 29. The position of the pusher arm 25 as it approaches the sprocket 23 is also shown by a dashed outline drawing of the pusher arm 25 and link 29.

Figure 5:
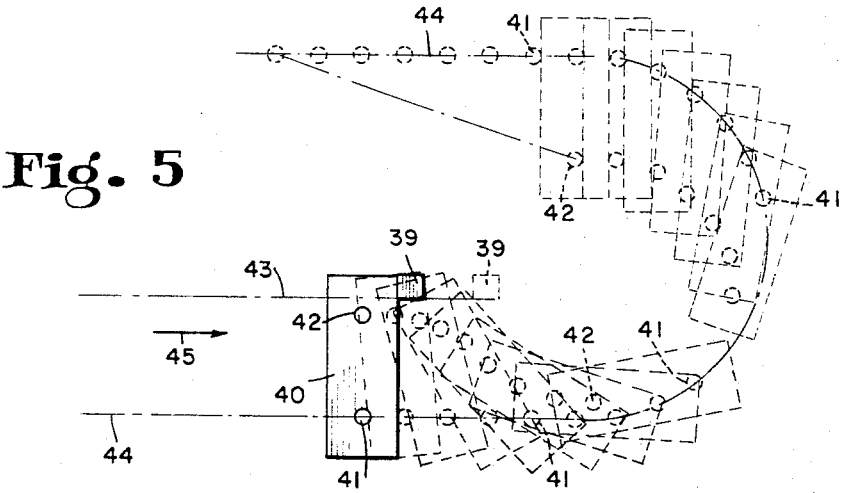
FIG. 5 is a graphical illustration showing the point at which a reciprocable element is released by the pusher arm.

Referring now to FIG. 5, an illustration showing the point at which a member 39, such as the member 28, will be released by a pusher arm 40, such as the pusher arm 25, when the pusher arm is moved about a rotor, such as the sprocket 24. The link, such as the link 29, which is required to pivot the pusher arm 40 is not shown in FIG. 5 for purposes of clarity. However, a pair of pivot pins 41 and 42 is shown to indicate the points at which the pusher arm 40 is pivotally connected to the endless, flexible element and the aforementioned link.

In the illustrative example of FIG. 5, the member 39 is arranged to reciprocate along the path indicated by the reference line 43 and the pivot pin 41 is arranged to move about the path indicated by the reference line 44, which is the path of the endless, flexible element carrying the pusher arm 40. It can be seen, therefore, that the maximum travel of the member 39 in the direction of the arrow 45 is approximately indicated, in FIG. 5, by the dashed outline form of the member 39.

Referring again to FIG. 1, it can be seen that the point at which the member 28 will be released by the pusher arm 25 is determined by the distance between the pivot pins 32 and 34, distance between the pivot pins 32 and 33, diameter of the sprocket 24 and distance that the pusher arm 25 extends beyond the pivot pin 34. That is, the pusher arm 25 is pivoted so that the end 27 of the pusher arm moves below the bottom surface of the member 28 when the pivot pin 33 moves around the sprocket 24. It can be seen that when the pivot pin 33 starts to move around the sprocket 24, the straight-line distance between the pivot pins 32 and 33 is progressively reduced and the pivot pin 34 is pushed rearwardly to pivot pin 32 by the rigid link 29.

Referring now to FIG. 6, another embodiment of the present invention will be discussed.

In the embodiment of FIG. 6, there is an endless chain 45 trained about three sprockets 46, 47 and 48. The sprocket 46 is mounted on a fixed shaft 49 for rotation. The sprocket 47 is rotatably mounted about a shaft 50 which is adjustably movable within a slot 51 formed in a support member 52. The position of the shaft 50 in the slot 51 can be fixed by tightening a fastening means, indicated generally by the reference number 53. The fastening means 53 may be any well known means for fastening a shaft in an elongated slot, such as the slot 51. The sprocket 48 is rotatably mounted on a shaft 54 which is arranged to move in an elongated slot in support member 56. There is a spring 57 arranged to urge the sprocket 48 in the direction of the arrow 58 to provide a predetermined tension on the chain 45. The sprocket 48, therefore, functions as an idler gear which is movable and spring loaded to provide a predetermined tension on the chain 45, thereby permitting adjustment of the sprocket 47.

There is a plurality of pusher arms 59, such as the pusher arm 25, pivotally mounted on the chain 45. There is a link 60, such as the link 29, associated with each of the pusher arms 59. Each of the links 60 has one end pivotally connected to the chain 45 at a first predetermined distance from the pivot point of the pusher arm 59 and its other end pivotally connected to the pusher arm 59 at a second predetermined distance from the first mentioned pivot point of the pusher arm 59. Specifically, each of the pusher arms 59 is pivotally connected to the chain 45 by means of a pivot pin 61. Likewise, each of the links 60 is connected to the chain 45 by means of a pivot pin 62 and to its associated pusher arm by means of a pivot pin 63. Each of the pusher arms 59 has an end 64 proportioned and arranged to engage and move an element a predetermined distance in the direction of the arrow 65. The arms 59 are pivoted as they move around the sprocket 47 to release the element pushed thereby. It can be seen, therefore, that the point at which the pusher arm 59 will release the element pusher thereby is determined by the location of the shaft 50 in the elongated slot 51.

In the embodiment shown in FIG. 6, the pusher arms 59 are illustrated somewhat longer than the pusher arms 25 shown in FIGS. 1, 2, 4 and 7. The extra length of the pusher arms 59 provides a greater area of contact for the element or mass being moved by the driving system. Also, the greater length of the pusher arms 59 is required when the path of the element being pushed is not linear.

Although the present invention has been discussed as a scanner drive device, it is quite apparent that the disclosed invention is, generally speaking, a means for moving an element in one direction along a predetermined path and automatically releasing said element at the end of its travel.

I claim as my invention:

1. Means for moving an element in one direction along a predetermined path and automatically releasing said element at the end of its travel, said moving and releasing means comprising an endless, flexible means trained about a pair of support means, at least one of said support means being rotatable and drivingly connected to said flexible means, a pusher arm having one end pivotally connected to said flexible means and its other end proportioned and arranged to move said element, link means having one end pivotally connected to said flexible means at a first predetermined distance from the pivot point of said pusher arm and its other end pivotally connected to said pusher arm at a second predetermined distance from said first mentioned pivot point of said pusher arm, said first and second predetermined distances being such as to cause said pusher arm to release said element when said link means and said pusher arm are moved about one of said support means.

2. Moving and releasing means as in claim 1 wherein said support means are rotors having predetermined diameters and wherein said pusher arm extends a predetermined distance beyond the point at which said link means is pivotally connected thereto, the release point of said element being determined by said predetermined diameters, said first and second predetermined distances from said first mentioned pivot point of said pusher arm and said predetermined distance beyond said point at which said link is pivotally connected to said pusher arm.

3. Moving and releasing means as in claim 1 including a third support means about which said flexible means is trained, means for resiliently mounting said third support means to provide a predetermined tension on said flexible means, and means for adjustably mounting one of said first mentioned support means selectively to determine the length of travel of said element.

4. Moving and releasing means as in claim 1 wherein said pusher arm extends inwardly to the closed loop path formed by said endless, flexible means and wherein said link means is pivotally connected to said flexible means at a point ahead of said pusher arm in the direction of travel of said flexible means.

5. Moving and releasing means as in claim 1 wherein said link means is pivotally connected to said flexible means at a point ahead of said pusher arm in the direction of travel of said flexible means.

6. A device of the class described comprising a scanner head arranged for movement along a predetermined path, energy storage means arranged to urge said scanner head in one direction along said path, means for moving said scanner head a predetermined distance along said path and in opposition to said energy storage means, said moving means comprising an endless, flexible means trained about a pair of support means, at least one of said support means being rotatably and drivingly connected to said flexible means, said support means being arranged to support said flexible means for movement in a direction substantially along said path, a pusher arm having one end pivotally connected to said flexible means and its other end proportioned and arranged to move said scanner head, link means having one end pivotally connected to said flexible means at a first predetermined distance from the pivot point of said pusher arm and its other end pivotally connected to said pusher arm at a second predetermined distance from said first mentioned pivot point of said pusher arm, said first and second predetermined distances being such as to cause said pusher arm to release said scanner head when said link means and said pusher arm are moved about one of said support means, thereby permitting said energy storage means to return said scanner head to its original starting position.

7. A device as in claim 6 wherein said scanner head is arranged for reciprocation along a guide means and wherein said one of said support means is disposed a predetermined distance from the original starting position of said scanner head to determine the stroke thereof.

8. A device as in claim 6 including an electrically operated means for selectively disengaging said scanner head from said pusher arm, thereby permitting said scanner head to be returned to its original starting position.

9. A device as in claim 8 wherein said electrically operated means includes a member carried by said scanner head and solenoid means operatively connected to said member, said solenoid means being arranged to move said member into and out of the path of said pusher arm, said scanner head being moved by said pusher arm engaging said member.

10. A device as in claim 7 wherein said support means is adjustably movable selectively to determine the stroke of said scanner head.

11. A device as in claim 6 wherein said pusher arm extends inwardly to the closed loop path formed by said endless flexible means and wherein said link means is pivotally connected to said flexible means at a point ahead of the pusher arm in the direction of travel of said flexible means.

12. Moving and releasing means as in claim 6 wherein said link means is pivotally connected to said flexible means at a point ahead of said pusher arm in the direction of travel of said flexible means.

References Cited

UNITED STATES PATENTS

| 2,605,841 | 8/1952 | Overman | 74—37 |
| 2,608,697 | 9/1952 | Condemi | 74—37 |
| 3,009,100 | 11/1961 | Muchnick | 73—104 |
| 3,037,223 | 6/1962 | Lovsey | 15—470 |
| 3,331,963 | 7/1967 | Lippke | 250—235 |

FOREIGN PATENTS

| 985,759 | 3/1951 | France. |

FRED C. MATTERN, JR., *Primary Examiner.*

W. S. RATLIFF, *Assistant Examiner.*